Feb. 17, 1931.  F. F. LANDIS  1,792,913
SHOCK DIFFUSER
Filed May 26, 1928
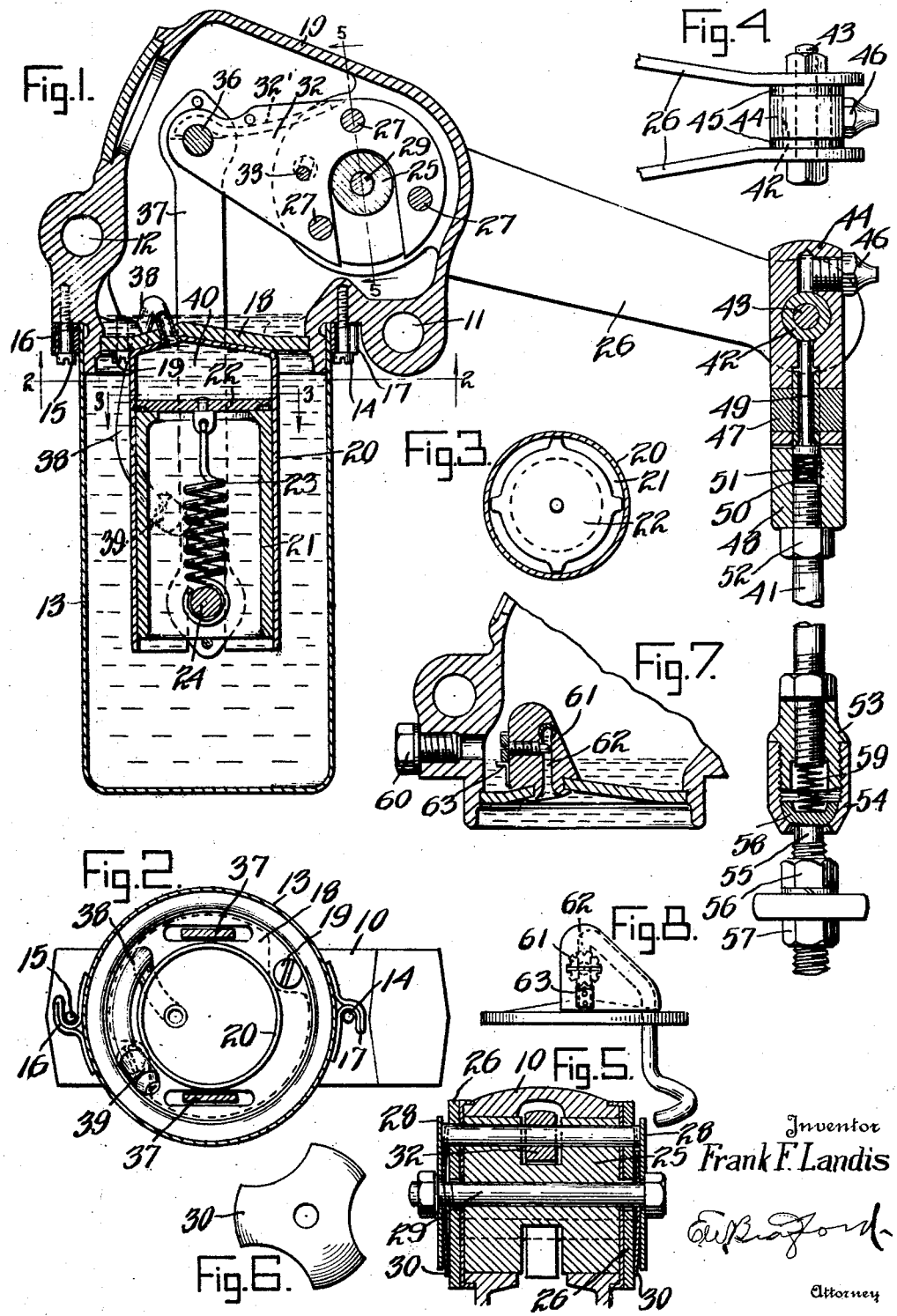
Inventor
Frank F. Landis
Attorney Patented Feb. 17, 1931

1,792,913

UNITED STATES PATENT OFFICE

FRANK F. LANDIS, OF WAYNESBORO, PENNSYLVANIA, ASSIGNOR TO FRANK F. LANDIS PATENTS, INCORPORATED, OF WAYNESBORO, PENNSYLVANIA, A CORPORATION OF PENNSYLVANIA

SHOCK DIFFUSER

Application filed May 26, 1928. Serial No. 280,913.

My invention relates to hydraulic shock diffusers, and it is an object of the invention to provide a device of this character adapted for use with vehicles, and particularly adapted for use on automobiles.

A further object of the invention is to provide means for taking up all lost motion between loose joints in a shock diffuser device whereby the hydraulic resistance will come into play at the very start of the recoil in the springs on the machine.

Another object is to provide a resistance to recoil in direct proportion to the extent of spring compression.

A further object of the invention is to provide structure whereby the mixing of air and oil will be prevented, and to further provide for quick separation of air and oil in case they do become mixed.

A still further object is to provide means for dissipating the heat generated in the oil in the container and thus to prevent the generation of gas in the body of the oil.

Another object is to provide a shock diffuser for a vehicle, which will not stiffen or preload the spring.

A further object is to provide a hydraulic shock diffuser of such construction that in operation there will be no reversal or change of direction in the flow of the resisting medium.

Another object is to provide a construction in which there will be no "wire drawing" or restriction to the flow of oil during spring compression.

A further object of the invention is to provide a shock diffuser having the characteristics above enumerated which shall also be compact in form, positive and reliable in action.

Further objects and advantages of the invention will become apparent as the description proceeds.

Referring to the accompanying drawings which are made a part hereof and on which similar reference characters indicate similar parts, Figure 1 is a vertical section of the device,
Figure 2, a section on line 2—2 of Fig. 1,
Figure 3, a section on line 3—3 of Fig. 1,
Figure 4, a plan view of a detail showing connection between an arm on the diffuser and the connecting link,
Figure 5, a section on line 5—5 of Fig. 1,
Figure 6, a detail view of a spring disk,
Figure 7, a vertical section showing in detail a modified form of by-pass valve, and
Figure 8, an elevational view of the modified by-pass structure shown in Fig. 7.

In the drawings numeral 10 indicates a casing which may be bolted to the frame of the machine by bolts passing through perforations 11 and 12. This casing carries most of the operative parts of the device. An oil container 13 is bolted to the under side of the casing by means of bolts 14 and 15, passing through ears 16 and 17 on the side of the oil container. The container may therefore be readily removed by loosening the bolts and slightly turning the container so as to release the hooks or ears from the bolts.

An inverted disk-like plate 18 is securely fastened to the lower part of the casing 10 by means of bolts or screws 19. To the lower part of this plate is secured an inverted cylinder 20 mounted so as to depend within the oil chamber 13. A piston 21 is positioned within this cylinder. The upper end of the piston 21 is closed by a disk valve 22 which is held seated upon the cylinder by means of a tension spring 23 secured to the valve at one end and to a pin 24 at its other end. The valve has lugs or ears to hold it properly aligned in the cylinder.

The housing 10 has a journal 25 mounted therein. This journal carries on its outer ends arms 26 rigidly secured to the journal by means of pins 27 which pass entirely through the length of the journal.

Two washers 28 are clamped against the ends of the pins 27 by means of a bolt 29 which passes through the journal. Between each of the washers 28 and the arms 26 are placed flat spring washers 30, which provide means for taking up all lost motion between the operating levers or arms 26 and the pins 27. In a recess in the center of the journal 25 a crank arm 32 is attached and is held to the journal by means of the three pins 27, which hold the arms 26 also upon the journal. All lost motion is taken up between the journal and the arm 32 by means of a spring 33 which passes through a hole in the journal and through a smaller hole in the arm 32. At its outer end, the arm 32 is connected to a journal 36 which passes through yoke links 37. These links are rigidly connected at their lower ends to journal 24, which is pivotally connected to the cylindrical piston 21. A leaf spring 32' on the arm 32 presses against the journal 36 and holds the arm 32 in close contact with the journal to take up any lost motion in the direction of automobile spring recoil at all times. A pipe 38, secured within the plate 18, is bent down so that its lower end extends well down into the oil container 13. A nozzle 39 on its lower end restricts the flow of fluid through the pipe 38. This nozzle may be removed and nozzles of any desired restriction used to regulate the restriction to suit springs of various tensions.

It will be readily seen from the structure just defined, that movement of the plunger 21 downward will permit oil to pass from the container 13 into the chamber 40 above the valve 22. When the plunger is moved upward the oil trapped in the chamber 40 may pass down through the pipe 38 through the nozzle 39. Since the oil must be forced through a restricted passage the upward movement of the plunger 21 will be retarded. The lower end of the pipe 38 is bent so as to direct the flow of oil in a direction somewhat tangential to the surface of the chamber 20, but slightly downward. Currents of oil therefore will move in a slightly downward direction and will not tend thereby to direct currents upwardly to churn up the surface of the oil and cause air bubbles, which create air pockets. Movement of the oil in the chamber 13 in the direction just indicated will also tend to circulate the oil around the sides of the container and assist in cooling the oil. It should also be noted that the oil under compression in the chamber 40 is a rather small proportion of the oil in the container 13. The oil from the chamber 40, which has been heated by compression, will be quickly cooled as it enters the container 13, which has large surfaces exposed to the atmosphere. These cooling features prevent any generation of gas within the oil, with its consequent gas pockets.

The pipe 38 enters the chamber 40 at the uppermost portion of the plate 18. Any air which may have found its way into the chamber 40 will therefore soon pass out through the pipe 38.

The arm 26 at its outer end is connected to a link 41 in the following manner:

A hardened steel bushing 42 surrounding a bolt 43 is held between the ends of the operating levers or arms 26. A universal joint yoke 44 fits over the hardened steel bushing and is held against endwise movement between the arms 26 by means of washers 45, of cork, fibre or other resilient material. These washers absorb any lost motion between the connecting elements. The upper end of the yoke 44 has screw threaded therein an oiler cup 46. At the lower end of the universal yoke joint 44 is a pivot pin 47 which connects the universal yoke to a universal joint knuckle 48. The pin 47 passes through the yoke at right angles to the plane of the pin 43. This provides for side sway and flexibility of spring suspension, thus permitting the points of attachment of the rigid link 41 to move onto the same vertical plane without straining the connections between the operating levers or arms 26 and their point of attachment to the axle of the vehicle.

A spring pressed plunger 49 passing up through the joint and yoke just described provides means for taking up lost motion between the hardened bushing 42, and the yoke 44. This pin is inserted from the the lower end of a bore 50. A spring 51 is held under compression against the upper end of the link 41 which latter is screw-threaded into the lower end of the knuckle 48 and tightly held therein by means of a nut 52. The link 41 is threaded at its lower end into a swivel stud housing 53. A swivel stud socket 54 is screwed upon the lower end of the swivel stud housing 53. A swivel stud 55 is clamped to the axle bracket by means of nuts 56 and 57. The top of the swivel stud 55 carries a hemispherical knob 58. Between the upper end of the knob 58 and the lower end of the rod 41 is a compression spring 59. This spring is of sufficient tension to keep the contact between the swivel stud socket 54 and the knob 58 in the direction of automobile spring recoil movement at all times, the spring 59 taking up all lost motion between the link 41 and the frame of the machine.

In Figs. 7 and 8 is shown a modified form of by-pass valve. In this form the casing 10 has an oil filling plug 60 screw-threaded therein. The by-pass passage 62 has a needle valve 61 positioned so as to regulate the flow of oil therethrough. A spring 63 is positioned so as to rest against the valve head and prevent its loose rotation. By removing the plug 60 the valve 61 may be adjusted to regulate the flow of oil through 62 as desired, as well as fill shock diffuser to the desired oil level.

With this form of restricted passage for the oil the velocity of oil is greatest at the restriction rather than at the lower end of the pipe. The oil therefore emerges from the pipe with less velocity than with the pipe 38 in the form shown in Fig. 1. This results in less disturbance of the oil in the container and less danger of foaming, all of which remove further possible danger of air pockets.

The operation of the device is believed to be sufficiently obvious from the foregoing description. It should again be noted that all moving parts are cushioned so as to take up any possible lost motion and to bring the checking action into play at the instant of recoil. Means for eliminating air pockets and gas due to heating the oil assure an easy slow recoil which results in a shock diffuser of the highest efficiency.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A shock diffuser comprising a housing, an oil chamber suspended thereto, an inverted cylinder mounted within said chamber, a piston reciprocably mounted within said cylinder, a reciprocating yoke vertically surrounding said cylinder, a rock arm pivotally connected to said piston and operative connection between said rock arm and a reciprocating member on a vehicle, substantially as set forth.

2. A shock diffuser comprising a rigid housing, an oil chamber secured beneath said housing, an inverted cylinder secured to said housing within said oil chamber, a plunger within said cylinder, a valve in said plunger, a restricted passage connecting the chamber at its uppermost point above said plunger with the lower portion of said oil chamber, a shaft in said housing, a rock arm on said shaft, a link operatively connecting said rock arm and said piston, and an arm rigidly secured to said shaft at one end and to a link at the other end, whereby upon movement of the link in one direction the piston may freely descend in the cylinder but will have its movement in the other direction restricted by the flow of oil above said plunger, substantially as set forth.

3. A shock diffuser comprising a rigid housing, an inverted cylinder mounted within said housing, a piston reciprocally mounted in said cylinder, a liquid container secured to the lower part of said housing and surrounding said cylinder, a restricted by-pass connecting the space at the top of said cylinder to the lower part of the liquid container, the lower end of the by-pass passage being directed slightly downwardly and tangentially to the inner surface of the container, whereby fluid passing through the by-pass passage will be directed at an angle slightly downward, substantially as set forth.

4. A shock diffuser comprising a housing, journal-bearings on the sides of said housing, a journal supported in said bearings, a detachable rock arm extending from the middle of said journal between the bearings, the said arm and said journal being held in constant contact by a spring having a fixed tension in the direction of said rock arm movement during the recoil movement of an automobile spring to which it is operatively connected, substantially as set forth.

5. A shock diffuser comprising a housing, a rock arm supported in bearings in said housing, a fluid container supported beneath said housing and secured thereto, an inverted cylinder within said container and supported by said housing, a valved piston reciprocally movable in said cylinder, a restricted port through the end of the cylinder, and a pipe connecting said port with the lower portion of said container, substantially as set forth.

6. In a shock diffuser an oil-filled chamber, a cylinder mounted in said chamber, a piston reciprocably movable in said cylinder, operative connection between said piston and the oscillating part of a vehicle comprising a yoke connected to said piston, an arm connected to said yoke, the yoke straddling said arm and said piston, and a spring adapted to hold said yoke and said piston in the direction of movement of said arm, yoke and piston during the recoil movement of the oscillating part of the vehicle, substantially as set forth.

7. In a shock diffuser, a housing, a detachable cylindrical fluid container secured to the bottom of said housing, a cylinder mounted within said container, a piston in said cylinder, means permitting fluid to flow from said container freely into said cylinder on one stroke of the piston, and means restricting the flow of fluid from said cylinder at its uppermost point on the opposite stroke of the piston, and operative connection between said piston and a vehicle spring, substantially as set forth.

8. In a shock diffuser a journal, a pair of operating levers secured upon said journal, a spring washer between each of said levers and the ends of said journal, the said washers having sufficient tension and being biased to retain always the same relation between the journal and the arms during automobile spring recoil movement, substantially as set forth.

9. In a shock diffuser, a rigid housing, a thin metal fluid container secured to the lower side thereof, a cylinder mounted within said container, a piston reciprocably mounted in said cylinder, a fluid by-pass connected to the top of said cylinder and adapted to deliver fluid in a direction tangential and at an angle slightly downward in said container whereby the fluid delivered through said by-pass will cause the whole body of oil in the container to whirl around the walls of said container and have the heat contained therein dissipated through the thin walls of said container, substantially as set forth.

10. In a shock diffuser, a fluid filled container, a cylinder mounted therein, a valved piston reciprocably mounted in the cylinder, a by-pass passage in said cylinder, and means for controlling the capacity of the by-pass at the uppermost point of said cylinder, substantially as set forth.

11. A shock diffuser comprising a rigid housing adapted to be secured on the frame of an automobile, a rigid inverted cylinder attached to the lower part of said rigid housing, a fluid container attached to the lower part of said housing, the upper end of said rigid inverted cylinder forming a division between said fluid container and the chamber formed by said housing, a body of liquid in said container filling in above or approximately at the level of the division between the housing and said container submerging the rigid inverted cylinder and the reciprocating piston, a reciprocating yoke passing through two slots in the division between the fluid container and housing for operating the piston, the said reciprocating yoke being journaled at its upper end upon an oscillating rock-arm crank, which is attached to an oscillating journal that is actuated by arms attached to a connection between the axle of the automobile, the said reciprocating yoke being the only connection between the submerged piston tending to make change of fluid level only equal the displacement of the reciprocating yoke connecting the oscillating rock-arm crank to the reciprocating piston, whereby the mixing of oil and air is prevented to provide a true hydraulic resistance at the very start of spring recoil movements, substantially as set forth.

12. In a shock diffuser, a rigid housing, an inverted cylinder attached therebeneath, the upper end of the cylinder being closed, a fluid container attached to the rigid housing completely surrounding said inverted cylinder, a body of oil in said container filling it to or slightly above the upper end of said inverted cylinder, a reciprocating piston in said inverted cylinder, a valve in the head of said piston, which valve has its seat on the face of piston head, a spring secured to the bottom or seat side of the valve, and connected to a yoke for actuating said piston from the lower or open end of said inverted cylinder, the piston being so connected to actuating yoke that a free port or opening is provided from the seat side of said valve through the inside of said piston and through the lower open end of said inverted cylinder to the space for fluid or oil immediately below and around said inverted cylinder and between the outside of said inverted cylinder and the inside of said fluid or oil container, a by-pass pipe leading from the closed end of said inverted cylinder and extending spirally around the outside of said inverted cylinder and inside of the fluid or oil container surrounding said inverted cylinder, the discharge end of said by-pass pipe adapted to direct the flow of oil through the by-pass pipe tangentially to the inner surface of said container and likewise downwardly toward the bottom of the container, whereby the oil on the inside of the walls of said container is caused to travel from the top of the container toward the bottom and around the entire inside of the container, and to rise through the central portion of said container through the open end of the inverted cylinder, through the port in the bottom of said piston and through the valve in the head of said piston, producing a continuous flow of oil in the same direction at all times regardless of the position of the reciprocating piston in said inverted cylinder, substantially as set forth.

13. A shock diffuser comprising a cylinder, a piston reciprocably mounted in said cylinder, a pivotally mounted rockarm, a yoke having its lower end journaled upon piston within the cylinder and its upper end journaled on the outer end of the rockarm, the said yoke straddling the outside of said cylinder, substantially as set forth.

In witness whereof, I have hereunto set my hand at Miami Beach, Florida this 22nd day of May, A. D. nineteen hundred and twenty-eight.

FRANK F. LANDIS.